July 22, 1958  N. E. LINDENBLAD  2,844,638
HEAT PUMP
Filed Jan. 4, 1954
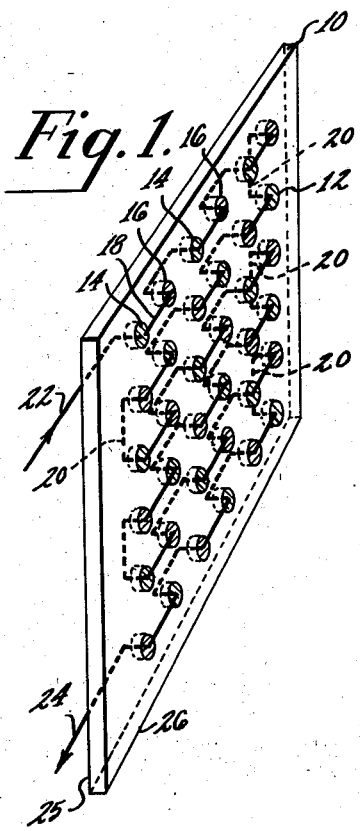
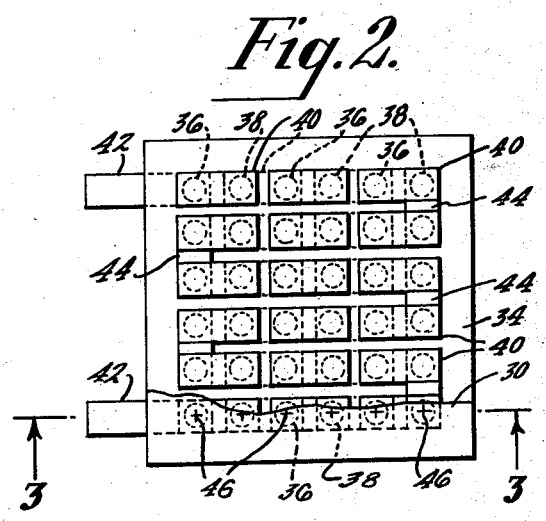
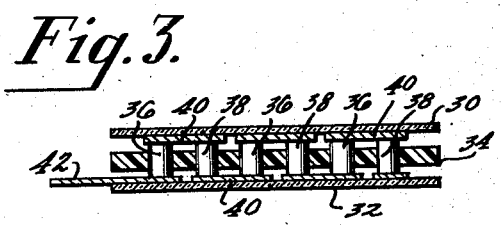
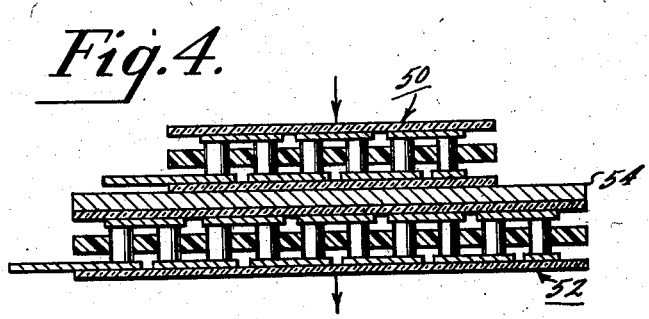
INVENTOR.
*Nils E. Lindenblad*
BY
ATTORNEY United States Patent Office 2,844,638
Patented July 22, 1958

2,844,638

HEAT PUMP

Nils E. Lindenblad, Princeton, N. J., assignor to Radio Corporation of America, a corporation of Delaware Application January 4, 1954, Serial No. 401,799

7 Claims. (Cl. 136—4)

This invention relates to thermoelectric heat pumps, and, more particularly, to a novel thermoelectric heat pump of compact thin panel construction.

When a direct current is passed in the proper direction through a thermocouple made up of rods of two dissimilar thermoelectric alloys joined in a closed circuit, one junction between the alloys becomes cool and absorbs heat while the other junction becomes hot and gives off heat. This phenomenon is known as the Peltier effect. When a number of these dissimilar rods are alternately arranged, connected serially and a direct current passed through them, alternate junctions become cold and hot. When the cold junctions and the hot junctions are segregated in thermal conducting relationship, a heat pumping thermopile is formed. Heat will be pumped from the absorbing cold junction side of the thermopile to the heat liberating hot junction side of the thermopile. Heat pumping thermopiles up to the present have been space consuming and designed for limited special applications. These structures have not been universally adaptable over the broad heat pump application field. This invention provides a universally adaptable and economically manufactured heat pumping thermopile in thin panel form.

The principal object of this invention is to provide a heat pumping thermopile of compact thin panel construction.

Another object is to provide a thin panel heat pumping thermopile which is adaptable for use in a wide range of heat pumping applications.

A further object is to provide a thin panel thermopile construction which lends itself to economical mass production manufacture.

Still another object is to provide a heat pumping thermopile in panel form which may be adapted to space requirements in the field.

An illustrative example of a thin panel heat pumping thermopile resembles a sandwich. The outer layers are formed of sheets of electricity insulating but heat conducting material. A filling layer between the two outer layers is made up of a plugged perforated plate of electricity and heat insulating material. Plugs of dissimilar thermoelectric alloys are placed alternately within the perforations. The ends of the plugs protrude a short distance from both surfaces of the insulating plate. Thin strips of electricity conducting material join dissimilar plugs in a series connected electrical circuit. This series circuit arrangement segregates hot junctions on one side of the sandwich and cold junctions on the other side. The sandwich will therefore absorb heat through one of its outer conducting layers and give off heat from the opposite side.

Other objects and advantages of the present invention will become apparent to those skilled in the art from a reading of the following specification in conjunction with the accompanying drawing in which:

Fig. 1 is a diagrammatic perspective view of a plugged perforated plate of insulating material;

Fig. 2 is a plan view of a thin panel thermopile with the upper outer layer partially removed;

Fig. 3 is a cross-sectional view in elevation of the panel shown in Fig. 2 taken along the line 3—3 in the direction of the arrows; and Fig. 4 is a cross-sectional view in elevation of a multi-panel thermopile made up of a number of single thin panel thermopiles.

In Fig. 1, a plate 10 of insulating material is perforated in an orderly manner by holes 12 passing completely through the plate. The perforations are arranged in horizontal and vertical rows. By insulating material is meant, a material which insulates against both heat and electricity. Plugs of two dissimilar thermoelectric alloys 14 and 16 are alternately arranged within the perforations. The term thermoelectric alloy is used herein to designate a substance which may be used in a thermocouple to produce the Peltier effect. These plugs, for example, may be made of bismuth and antimony. In this alternate arrangement, one plug is bismuth and the adjacent plugs are antimony. Electrical connectors 18 connect the ends of the alternate plugs to form a series circuit progressing horizontally across each row. Vertical connectors 20 connect the extremities of the horizontal rows to carry the series connected plug circuit completely through the plug-studded plate 10. Conductors 22 and 24 are provided to connect the series connected alloys to a source of potential (not shown). Cold junctions may, therefore, be segregated on one side, for example, side 25 of the plate 10; and hot junctions may be segregated on the other side 26 of the plate 10.

When a direct current is passed through the series connected dissimilar alloys, the junctions on the side 25 become cold and the junctions between the alloys on the side 26 become hot. The connecting strips 18 and 20 conduct heat as well as electricity. They therefore aid the cold plug junctions in absorbing heat on the cold side 25. This heat is pumped through the plugs to the hot side 26. At the hot side 26, the heat is given off to the adjacent atmosphere. This compact panel may be conveniently utilized over a wide range of heat pumping applications. Electrical insulation, however, must be provided to sheath the exposed protruding ends of the plugs and the junction forming connectors.

In Fig. 2 is shown a plan view of an insulating panel with the top insulating sheet 30 partially removed. The lower sheet 32 and the top insulating sheet 30 are made of material which conducts heat but insulates with respect to electricity. These enclosing sheathing layers allow heat to be absorbed, carried through the panel by the Peltier effect and given off. The sheets 30 and 32 may be made, for example, of beryllium oxide which conducts heat relatively well and is electrically insulating sheets of metal with a thin insulating coating, such for example as a copper sheet with a film of shellac, may also be used. The inner perforated insulating plate 34 may, for example, be made of Micarta or asbestos or a lava compound which is insulating with respect to both heat and electricity. Plugs 36 and 38 made of dissimilar thermoelectric alloys, for example, bismuth and antimony are arranged alternately within the perforations. As described before in Fig. 1, for ease of connection the perforations and plugs are arranged in horizontal and vertical rows. Horizontal strips 40 of electricity and heat conducting material, for example, copper, connect the horizontally arranged dissimilar plugs consecutively to one another. Vertical strips 44 connect the horizontal rows of plugs in series arrangement through the plate. Extension strips 42 provide terminals for connecting a source of potential (not shown) to the series connected plugs.

This thin panel thermopile illustrated herein resembles a sandwich. The outer layers are made of heat conducting, electricity insulating, beryllium oxide. The filling layer or core is made of a perforated sheet of insulating Micarta having dissimilar bismuth and antimony plugs disposed within the perforations or studding the sheet.

When an electric current is passed through the series connected circuit, the junctions segregated on one side of plate 34 become hot and the junctions segregated on the opposite side of the plate 34 become cold. The outer sheets 30 and 32 of beryllium oxide electrically insulate the exposed plug ends and connecting strips. These outer layers or sheets 30 and 32 conduct heat. Heat will, therefore, be absorbed by the cold junctions through one outer sheet and given off by the hot junctions through the other outer sheet. If the cold junctions are segregated adjacent sheet 32, heat will be absorbed through sheet 32 and given off by the hot junctions through sheet 30.

A panel of extensive plan area may easily be formed in this manner by mass production methods. The panels may be formed in large slabs which may be conveniently rolled. The center insulating layer or core sheet may be predrilled to receive the alloys. The alloys may be formed of long bars of thermoelectric material and precut to the predetermined plug length. They may be cut large enough to protrude through both sides of the center insulating sheet. The connecting strips 40 and 44, and terminal extension strips 42 may also be mass produced in large quantities. The panels may be made up in standard lengths and widths in a similar manner to well known types of sheet building material.

When constructing an enclosed compartment to be heated or cooled, these panels may be utilized to either form or line the walls of the compartment. Standard lengths and widths may be utilized wherever feasible. Where standard lengths will not fit, the panels may be cut down to conform to the space to be filled. In cutting the panels to size, the slit must run between the rows of plugs. Markings 46 may be inscribed on the outer sheets 30 and 32 to indicate the plug locations as a guide in slitting. It may be necessary to supply extra vertical connecting strips to join the split horizontal rows of thermopile plugs. The connecting strips may be especially adapted for field connection work.

When the enclosure is constructed of these panels, the entire wall surface of the enclosure will act as a heat pump. The direction of pumping may be easily reversed, if current is sent through in one direction, with the plugs properly arranged and connected, heat is absorbed from the atmosphere and material within the enclosure by the cold junctions within the panel. The heat energy will be transmitted by the Peltier effect to the hot junctions in the opposite side of the panel. The heat is liberated by the hot junctions to pass off into the ambient or surrounding atmosphere. The heat conducting but electricity insulating outer sheet collects the heat liberated by the individual hot junctions and liberates it uniformly over its entire surface. Heat is in this manner pumped from inside the enclosure through the thin panel walls and uniformly out into the surrounding atmosphere.

To reverse the heat pumping process, the current is passed through the thermopile in the opposite direction. Heat is then pumped through the outer sheathing into the outer heat absorbing "cold junctions." The alloy plugs conduct the heat through the insulating core of the panel into the inner heat liberating "hot junctions." The inner heat conducting beryllium oxide sheathing conducts the liberated heat within the enclosure.

In Fig. 4, a multipanel thermopile is constructed of two individual thin panel thermopile sandwiches 50 and 52. A sheet of heat conductive material 54, for example copper, is interposed between the two thermopile panels. The individual panels or thermopile sandwiches are of nonuniform or different heat pumping capacity. Since these illustrated panels are made with uniform spaced thermopile plugs, a non-uniform heat pumping capacity arrangement is formed of panels having different plan areas. In pumping heat from one side of the panel to the other, not only the heat from the absorbing side, but also the Joulean losses generated in passing current through a resistor must be transmitted. In a multipanel arrangement, therefore, the panels from the heat absorbing side to the heat rejecting side must be graduated to increase in heat pumping capacity. The number of junction forming plugs must increase in each succeeding panel going from the heat absorbing to the heat liberating side. With uniformly studded panels as illustrated in Fig. 4, panels of greater plan area must be utilized to provide more junction forming plugs. If a panel having more closely spaced plugs is utilized for the second or larger panel of the multipanel arrangement, the second higher capacity panel may have the same plan area as the first.

These relatively thin panels lend themselves to mass production methods. If produced in extremely large quantities, they provide a relatively inexpensive method of thermal conditioning a compartment, a room or even an entire home. If utilized within the roof of a building, they may utilize the heat of the rays of the sun to help heat the home in the winter. In the summer, the direction of current flow may be reversed to help prevent the sun's rays from heating the space below.

What is claimed is:

1. A thin panel thermoelectric pile for maintaining a relatively high temperature gradient across its relatively thin cross-section comprising a perforated plate of insulating material, plugs constituted of dissimilar thermoelectric alloys, dissimilar ones of said plugs being disposed alternately within the perforations in the insulated plate to form a plug-studded plate, strips of conducting material, said strips connecting adjacent ends of said dissimilar plugs to connect said plugs in a series circuit, and sheets of electricity insulating but heat conducting material thermally and electrically isolated from each other sheathing both sides of said plug studded insulating plate to form the outer walls of said panel.

2. A thin panel thermopile sandwich comprising in combination two space layers of electricity insulating but heat conducting material and a filling layer disposed between said two outer layers, said filling layer being comprised of a perforated plate of insulating material studded with alternately disposed plugs of dissimilar thermoelectric alloys, the ends of said plugs protruding a short distance from both sides of said plate, and strips of conducting material connecting the protruding ends of different ones of said alternately disposed plugs protruding from like sides of said plate in a series electrical circuit, said strips on one side of said plate being in thermal and electrical contact with one of said layers, said strips on the other side of said plate being in thermal and electrical contact with the other of said layers.

3. A multipanel thermopile comprised of a plurality of thermopile sandwiches of nonuniform graduated heat pumping capacity wherein each sandwich is comprised of the combination set forth in claim 2, sheets of heat conductive material interposed between each sandwich, said individual sandwiches being arranged in the order of heat pumping capacity.

4. A thin thermoelectric heat pumping panel comprised of a perforated plate of insulating material, plugs constituted of dissimilar thermoelectric alloys dissimilar ones of said plugs being disposed alternately within said perforations to stud said insulating plate, the ends of said plugs protruding a short distance through both sides of said insulating plate, strips of conducting material connected between ends of pairs of said dissimilar plugs protruding from like sides of said plate, said strips connecting said plugs in series relationship, and sheets of electricity insulating but heat conducting material thermally and electrically isolated from each other sheathing said plug studded insulating plate.

5. A thin panel thermopile comprised of a perforated plate of insulating material, plugs constituted of dissimilar thermoelectric alloys, dissimilar ones of said plugs being disposed alternately within said perforations, the ends of said plugs protruding a short distance through both sides of said insulating plate, strips of conducting material, said strips connecting said plugs in series relationship, a source of potential, said series circuit being connected across said source of potential, said connecting strips providing heat absorbing "cold" junctions on one side of said insulating plate and heat liberating "hot" junctions on the other side of said insulating sheet, and sheets of electricity insulating but heat conducting material thermally and electrically isolated from each other sheathing both sides of said plate to electrically insulate said "hot" and "cold" junctions.

6. A thin panel thermopile structure well adapted for mass production in large sheets for cutting to size in the field comprising a perforated plate of insulating material, plugs constituted of dissimilar thermoelectric alloys, said plugs being disposed within the perforations in the insulated plate to form a plug studded plate, strips of conducting material, said strips connecting adjacent ends of dissimilar plugs in a series circuit, sheets of electricity insulating but heat conducting material thermally and electrically isolated from each other sheathing both sides of said plate so as to sheath said strips and said plugs therein, and the outer visible surface of said sheets being marked to indicate the positions of said sheathed plugs.

7. A thin panel heat pumping thermopile sandwich comprising two thermally and electrically isolated outer layers of electricity insulating and heat conducting material and a core separating said two outer layers disposed therebetween, said core being comprised of a perforated plate of insulating material, plugs constituted of dissimilar thermoelectric alloys disposed within said perforations, and strips of conducting material connecting ends of dissimilar plugs in an electrical circuit, one of said outer layers being in contact with said strips on one side of said core, the other of said outer layers being in contact with said strips on the other side of said core.

References Cited in the file of this patent

UNITED STATES PATENTS

| | | |
|---|---|---|
| 420,641 | Dewey | Feb. 4, 1890 |
| 1,848,655 | Petrik | Mar. 8, 1932 |
| 1,896,040 | Ruben | Jan. 31, 1933 |
| 2,335,930 | Freeland | Dec. 7, 1943 |
| 2,510,397 | Hensell | June 6, 1950 |

OTHER REFERENCES

Electrical Engineering, July 1951, pp. 589–591.

Mellor, J. W.: "A Comprehensive Treatise on Inorganic and Theoretical Chemistry," Longmans, Green & Co., London, 1949, vol. IV, pages 221–222.